US010482907B1

(12) United States Patent
Mani Biswas et al.

(10) Patent No.: US 10,482,907 B1
(45) Date of Patent: Nov. 19, 2019

(54) METHODS OF PROTECTING WRITE POLE FROM CORROSION IN HAMR HEAD (71) Applicant: Western Digital Technologies, Inc., San Jose, CA (US)

(72) Inventors: Mousumi Mani Biswas, Redwood City, CA (US); Marc A Finot, Palo Alto, CA (US); Barry Cushing Stipe, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/144,936

(22) Filed: Sep. 27, 2018

(51) Int. Cl.
G11B 5/40 (2006.01)
G11B 5/60 (2006.01)
G11B 5/00 (2006.01)

(52) U.S. Cl.
CPC .............. G11B 5/40 (2013.01); G11B 5/6082 (2013.01); G11B 2005/0021 (2013.01)

(58) Field of Classification Search
CPC .. G11B 5/40; G11B 5/6082; G11B 2005/0021
USPC ......................................... 360/125.3–125.35
See application file for complete search history.

(56) References Cited

U.S. PATENT DOCUMENTS

| 6,353,511 B1 * | 3/2002 | Shi ....................... G11B 5/3109 360/123.49 |
| 6,618,223 B1 * | 9/2003 | Chen .................... G11B 5/3109 360/123.23 |
| 6,650,503 B1 * | 11/2003 | Chen .................... G11B 5/3146 360/125.43 |
| 7,522,379 B1 | 4/2009 | Krounbi et al. |
| 7,532,434 B1 | 5/2009 | Schreck et al. |
| 7,672,080 B1 * | 3/2010 | Tang ..................... G11B 5/1278 360/125.03 |
| 8,619,514 B1 * | 12/2013 | Matsumoto ............ G11B 5/314 369/13.33 |
| 8,861,316 B2 | 10/2014 | Yin et al. |
| 8,902,720 B1 * | 12/2014 | Schreck ............... G11B 5/3106 369/13.33 |
| 8,923,100 B1 | 12/2014 | Wessel et al. |

(Continued)

FOREIGN PATENT DOCUMENTS

JP 02012608 A * 1/1990 ........... G11B 5/1278

OTHER PUBLICATIONS

Kief et al; "Materials for heat-assisted magnetic recording"; Cambridge Core; vol. 43 Issue 2; Feb. 2018; pp. 87-92 <https://www.cambridge.org/core/journals/mrs-bulletin/article/materials-for-heatassisted-magnetic-recording/9A79B5C790C79E2CAB674599EFD21AD1/core-reader >.

Primary Examiner — Allen T Cao
(74) Attorney, Agent, or Firm — Gabriel Fitch; Loza & Loza, LLP (57) ABSTRACT A write pole in a heat assisted magnetic recording (HAMR) head for writing to a HAMR medium is provided that includes a recessed part proximal to a near field transducer (NFT) in the HAMR head to protect the write pole from corrosion. The recessed part extends from a portion of a bottom surface of the write pole along a portion of a side of the write pole proximal to the NFT. Within the recessed part, a pole pedestal may be formed of a material that is resistant to corrosion. The pole pedestal may have a rectangular, chamfered, or L-shape. The recessed part may further be induced on the portion of bottom surface of the write pole that extends along the portion of the side of the write pole.

20 Claims, 8 Drawing Sheets (56) References Cited

U.S. PATENT DOCUMENTS

| | | | |
|---|---|---|---|
| 9,025,281 B2 | 5/2015 | Rejda et al. | |
| 9,036,307 B1 * | 5/2015 | Hoshiya | G11B 5/3903 360/313 |
| 9,142,233 B1 | 9/2015 | Gibbons et al. | |
| 9,147,406 B1 | 9/2015 | Wessel | |
| 9,449,625 B1 | 9/2016 | Vossough et al. | |
| 2006/0198048 A1 * | 9/2006 | Flint | G11B 5/31 360/125.3 |
| 2012/0262824 A1 * | 10/2012 | Jubert | G11B 5/3116 360/119.01 |
| 2015/0055441 A1 * | 2/2015 | Rejda | G11B 5/314 369/13.33 |
| 2015/0235658 A1 * | 8/2015 | Cao | G11B 5/314 369/13.33 |
| 2016/0133291 A1 * | 5/2016 | Chen | G11B 5/314 369/13.33 |

* cited by examiner

|  | Hdown (Oe) | Hperp (Oe) | Hmag (Oe) | Hang (degree) |
|---|---|---|---|---|
| WP_Normal | 0.00 | 0.00 | 0.00 | 0.00 |
| WP_Lshape | -6.23 | -6.90 | -6.56 | -0.20 |
| WP_Chamfer | -10.58 | -12.30 | -11.43 | -0.55 |
| WP_rect_H10 | -7.86 | -3.55 | -5.70 | 1.31 |
| WP_rect_H20 | -11.82 | -8.34 | -10.07 | 1.11 |
| WP_rect_H30 | -13.54 | -12.35 | -12.95 | 0.39 |

METHODS OF PROTECTING WRITE POLE FROM CORROSION IN HAMR HEAD

INTRODUCTION

In heat assisted magnetic recording (HAMR) technology, an FePt based recording medium may be heated to above its Curie temperature (Tc) using a laser. The laser generated heat may be guided to the medium using a near-field transducer (NFT) placed near an inductive write pole on the HAMR head. As the medium cools, writing is then carried out during the refreezing process. Because the bit transitions are determined by the thermal gradients, as opposed to just the write field gradients, much higher linear/track densities can be achievable with HAMR as opposed to previous magnetic recording technologies.

When the laser is on, the NFT and the surrounding materials reach very high temperatures and media back-heating increases the total heat load. Due to the high heat, a protective overcoat on the HAMR head air bearing surface (ABS) may be compromised or may even disappear after just a few seconds of laser heating. Without the protective overcoat, the portion of the write pole near the NFT may become heavily oxidized, causing corrosion. Once pole corrosion begins, the corrosion may spread on the ABS, resulting in damage to the entire write pole bottom surface.

Higher moment materials may be more prone to corrosion, and therefore, the problem of pole corrosion may become more critical as higher moment materials are utilized in write poles. In addition, in order to improve the areal density, the write pole may include a thinner head overcoat, which may further necessitate a separate pole protection mechanism. Moreover, in configurations in which the NFT includes a capping material that produces an increased heat concentration at the bottom of the pole, additional pole protection measures may be required to protect the pole from corrosion.

DETAILED DESCRIPTION

Referring now to the drawings, embodiments of heat assisted magnetic recording (HAMR) heads that facilitate protection of the write pole from corrosion are illustrated. One example HAMR head design involves a write pole including a recessed part proximal to a near field transducer (NFT) in the HAMR head to protect the write pole from corrosion. The recessed part extends from a portion of a bottom surface of the write pole along a portion of a side of the write pole proximal to the NFT. Within the recessed part, a pole pedestal may be formed of a material that is resistant to corrosion. The pole pedestal may have a rectangular, chamfered, or L-shape. The recessed part may further be induced on the portion of bottom surface of the write pole that extends along the portion of the side of the write pole. Methods of manufacturing such HAMR heads are also disclosed.

Figure 1:
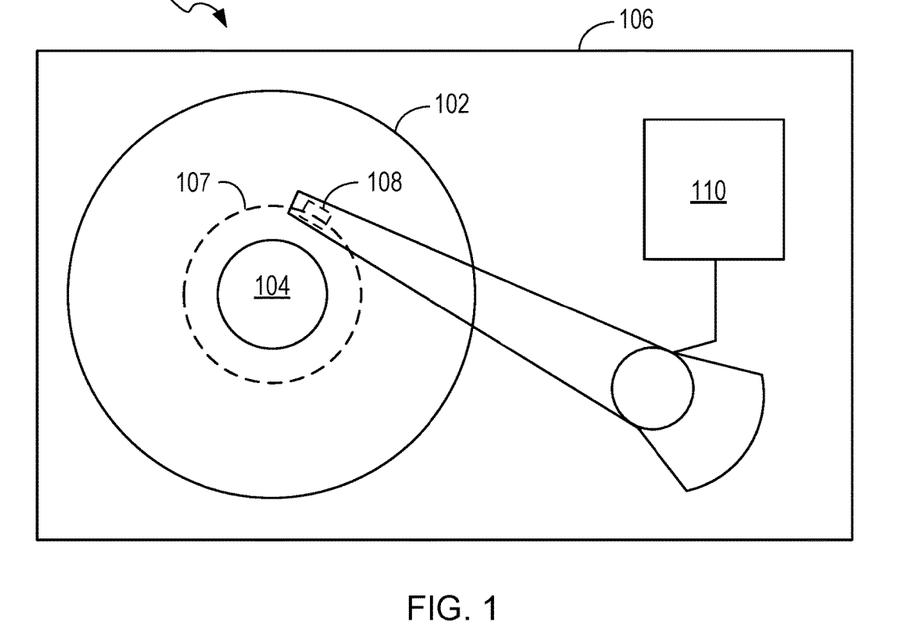
FIG. 1 is a top schematic view of a disk drive configured for heat assisted magnetic recording (HAMR) in accordance with one embodiment of the invention.

FIG. 1 is a top schematic view of a disk drive 100 configured for heat assisted magnetic recording (HAMR) and including a magnetic medium 102 in accordance with one embodiment of the invention. A laser (not visible in FIG. 1, but see FIG. 2) is positioned with a slider 108 including a HAMR head (not visible in FIG. 1, but see FIG. 2).

Disk drive 100 may include one or more disks/media (collectively referred to as a magnetic medium) 102 to store data. The magnetic medium 102 can include a substrate, a heat sink on the substrate, one or more seed layers on the heat sink, one or more magnetic recording layers on the seed layer(s), an overcoat layer typically formed of amorphous diamond-like carbon (DLC), and a liquid lubricant layer. In one embodiment, the magnetic recording layer(s) can be made of one or more materials such as FePt, CoPt, and/or FePd.

Magnetic medium 102 resides on a spindle assembly 104 that is mounted to drive housing 106. Data may be stored along tracks in the magnetic recording layer of medium 102. The reading and writing of data is accomplished with the HAMR head that may have both read and write elements. The write element is used to alter the properties of the magnetic recording layer of medium 102 and thereby write information thereto. In one embodiment, the HAMR head may have magneto-resistive (MR), or giant magneto-resistive (GMR) elements. In another embodiment, the HAMR head may be another type of head, for example, an inductive read/write head or a Hall Effect head.

In operation, a spindle motor (not shown) rotates the spindle assembly 104, and thereby rotates medium 102 to position slider 108 at a particular location along a desired disk track 107. The position of slider 108 relative to medium 102 may be controlled by position control circuitry 110.

Figure 2:
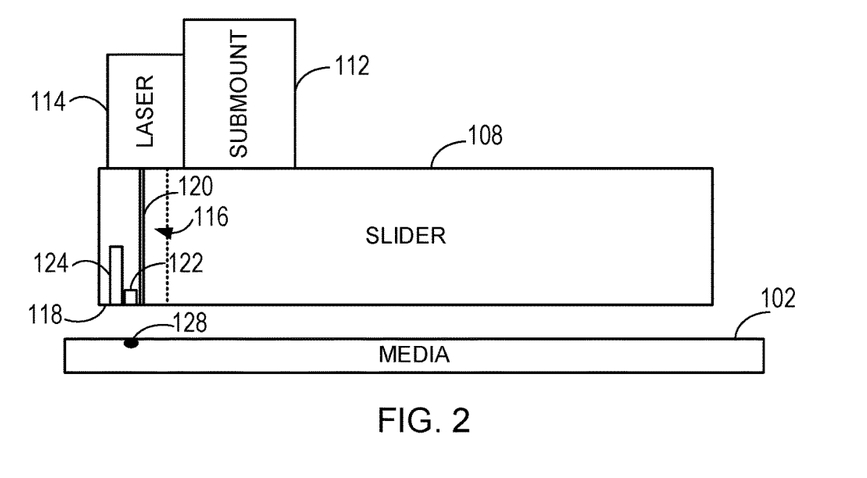
FIG. 2 is a side cross sectional schematic view of selected components of the HAMR system of FIG. 1 including a write element of a HAMR head in accordance with one embodiment of the invention.

FIG. 2 is a side cross sectional schematic view of selected components of the HAMR system of FIG. 1 in accordance with one embodiment of the invention. The HAMR system components include the medium 102 and slider 108. A sub-mount 112 is attached to a top surface of the slider 108. A laser 114 is attached to the sub-mount 112, and possibly to the slider 108. The laser 114 may include, for example, a laser diode, light emitting diode (LED), surface emitting diode, edge emitting laser diode, vertical cavity surface emitting laser (VCSEL), or other type of lasing apparatus.

The slider 108 further includes a HAMR head 116, which includes a write element and a read element positioned along an air bearing surface (ABS) 118 of the head 116 for writing information to, and reading information from, respectively, the medium 102. The read element may include, for example, a magneto-resistive read element, while the write element may include, for example, an inductive write element.

Exemplary components of the write element of the HAMR head 116 are also illustrated in FIG. 2. The write element includes a waveguide 120, a near-field transducer (NFT) 122, and a write pole 124, and coils (not shown, for simplicity). The waveguide 120 can include a core surrounded by cladding layers, each of which can be made of one or more materials, such as $Al_2O_3$, $SiO_xN_y$, $SiO_2$, $Ta_2O_5$, $TiO_2$, or other dielectric material. The NFT 122 can be made of a low-loss metal, such as Au, Ag, Al, Cu, or combinations thereof. The write pole 124 can be made of a high moment magnetic material, such as FeCo, CoFeNi, and other similar materials. The coil(s) can be made of an electrically conductive material, such as Cu, Ag, Au, and combinations thereof.

The NFT 122 is located near the ABS 118 (e.g., bottom surface) of the head 116. The ABS 118 can include a protective overcoat, such as a DLC overcoat having a thickness in the range of 1 to 6 nm and whose outer surface forms the ABS 118. The write pole 124 further includes an end proximal to the ABS 118 and the NFT 122.

In an exemplary write operation of the write element of the HAMR head 116, the laser 114 is configured to generate and direct light energy to the waveguide 120, which directs the light to the NFT 122. Upon receiving the light from the laser 114 via the waveguide 120, the NFT 122 generates localized heat energy that heats a region 128 (or "bit") of the medium 102 near the write pole 124 of the write element. During heating, the coil(s) generate a magnetic field that is transferred to the write pole 124 to apply a recording magnetic field to the region 128 (e.g., "write" to the region 128) on the medium 102.

Heating of the NFT 122 during the writing process may compromise or remove the protective overcoat on the ABS 118 from a portion of the write pole 124 near the NFT 122. This, in turn, may result in the write pole 124 becoming heavily oxidized, thus causing corrosion of the write pole 124. To minimize and/or prevent such corrosion, in one embodiment, the write pole 124 can include a recessed part (not visible in FIG. 2, but see FIG. 3) proximal to the NFT 122.

Figure 3:
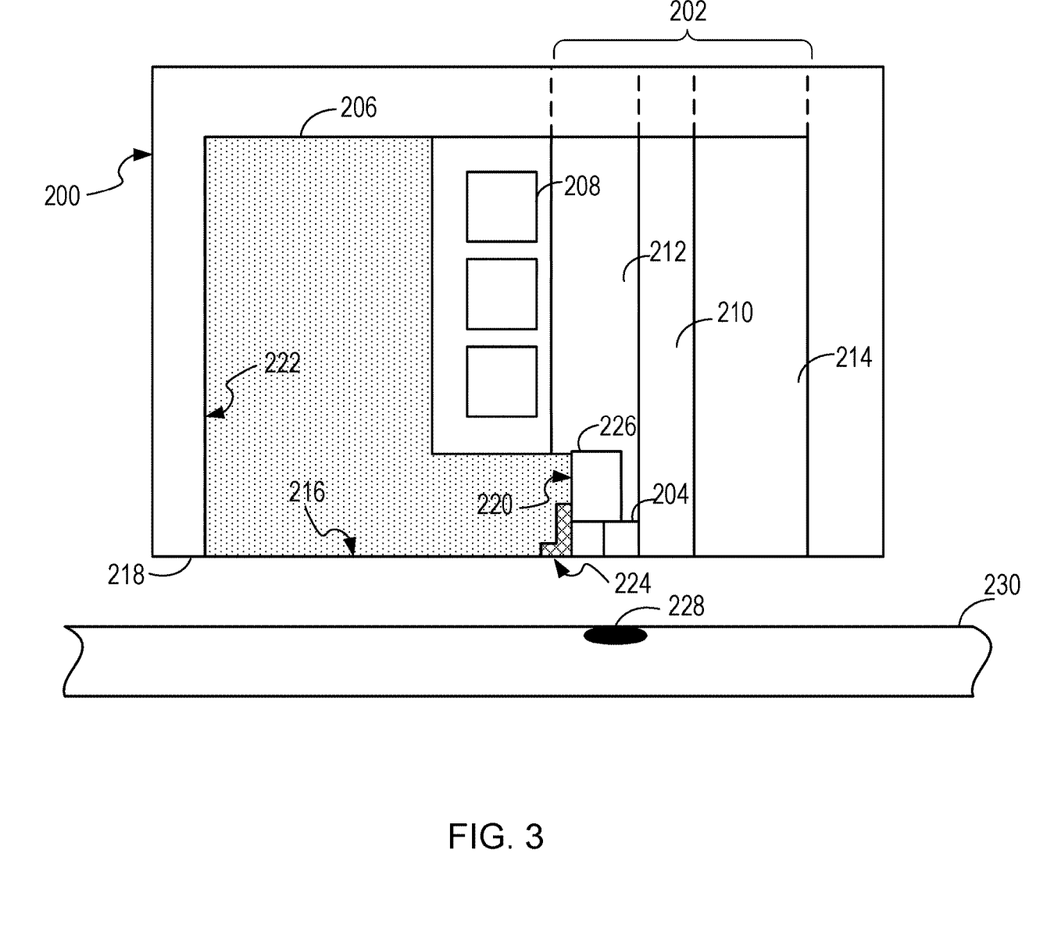
FIG. 3 is a side cross-sectional view of selected components of a write element of a HAMR head including a write pole having a recessed part in accordance with one embodiment of the invention

FIG. 3 is a side cross-sectional view of selected components of a write element 200 of a HAMR head in accordance with one embodiment of the invention. The write element 200 includes a waveguide 202, an NFT 204, a write pole 206, and coil(s) 208. In some examples, the waveguide 202, NFT 204, and write pole 206 may correspond to the waveguide 120, NFT 122, and write pole 124 shown in FIG. 2. The waveguide 202 includes a core 210 surrounded by cladding layers 212 and 214. The refractive index of the core 210 can be higher than that of the cladding layers 212 and 214 to direct light (electromagnetic energy) coming from the laser (shown in FIG. 2) through the core 210.

The write pole 206 includes a bottom surface 216 proximal to an air bearing surface (ABS) 218 of the write element 200, a first side 220 proximal to the NFT 204 and a second side 222 opposite the first side 220. The write pole 206 further includes a recessed part 224 that extends from a portion of the bottom surface 216 along a portion of the first side 220 proximal to the NFT 204. The recessed part 224 forms a three-dimensional cavity within the write pole 206 that effectively moves the bottom of the write pole 206 away from the NFT 204. In some examples, the recessed part 224 may be designed to provide a particular cavity shape, such as the L-shape shown in FIG. 3. In one embodiment, the recessed part 224 may be filled by a pole pedestal formed of a material that is resistant to corrosion. In other embodiments, the recessed part 224 may include an insulating material, such as cladding material or other material different from the material of the write pole 206. Examples of insulating materials may include, but are not limited to, $Al_2O_3$, $SiO_xN_y$, $SiO_2$, $Ta_2O_5$, or other similar oxide.

The write element 200 may further include a heat sink 226 made of a thermally conductive material proximal to or in direct contact with the NFT 204 and selected to avoid reduction of the heat energy transfer from the waveguide 202 to a region 228 on a medium 230. In some examples, the medium 230 may correspond to the magnetic medium 102 shown in FIGS. 1 and 2. The heat sink 226 may further be proximal to the write pole 206. In addition, the heat sink 226 may be thermally coupled to the pole pedestal in the recessed part 224 of the write pole 206.

Figure 4:
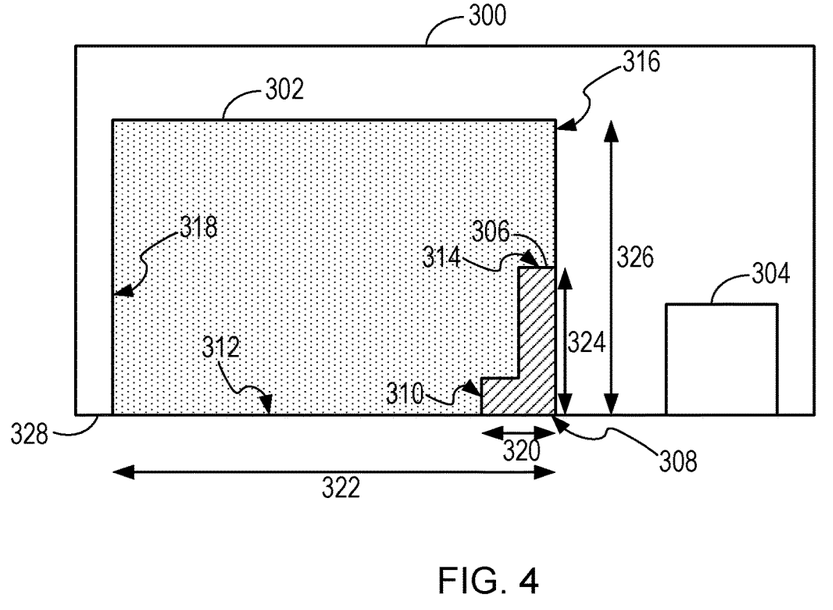
FIG. 4 is a bottom view of selected components of the write element of the HAMR head including a write pole having a pole pedestal within the recessed part in accordance with one embodiment of the invention.

FIG. 4 is a side view of selected components of a write element 300 of the HAMR head in accordance with one embodiment of the invention. In particular, FIG. 4 illustrates a simplified representation of a write pole 302 and NFT 304 as viewed from the side of the write element 300. In some examples, the write element 300, write pole 302, and NFT 304 may correspond to the write element 200, write pole 206, and NFT 204 shown in FIG. 3. The write pole 302 includes a pole pedestal 306 formed within a recessed part 308 (e.g., which may correspond to the recessed part 224 shown in FIG. 3).

The pole pedestal 306 can be made of one or more materials that are more resistant to corrosion than the write pole 302. For example, the pole pedestal 306 can be made of a non-magnetic material, such as a noble metal or an alloy of Rh, Ru, Ir, Ni, V, W, Au, Pt, Ti, Cr, or Ta. The pole pedestal can further be made of a stable oxide, such as $Ta_2O_3$, $Y_2O_3$, $Cr_2O_3$, $ZrO_2$, $HfO_2$, $TiO_2$, $SiO_2$, Ferrite ($Ni_xFe_yO_z$, where x, y, and z are atomic percentages between 0-100%), Ba-Ferrite, Zn-Ferrite, Sr-Ferrite, or other similar Ferrite that is more resistant to corrosion than the write pole 302. The pole pedestal can further be made of a sacrificial layer of materials that are more resistant to oxidation than the write pole 302, such as Si, Ta, Zr, Ti, Hf, Y, and other similar materials. The pole pedestal 306 can further be made of a magnetic material that includes a lower magnetic moment. For example, the pole pedestal 306 may include a magnetic moment of less than or equal to 1.8 T, whereas the write pole 302 may include a magnetic moment between 1.8 T and 4 T. The pole pedestal 306 may further be made of a magnetic material that includes a higher atomic percentage of Ni than the write pole 302. One example of a magnetic material that may be used for the pole pedestal 306 may include $Fe_xNi_yCo_z$, where x, y, and z are atomic percentages varying between 0-100%, with y being greater than 40% to provide for lower oxidation. In this example, the write pole 302 may include a Ni percentage that is 20% less than that of the pole pedestal 306.

The pole pedestal 306 can have a particular shape, such as a rectangular, chamfered, or L-shape, the latter being illustrated in FIG. 4. In the example shown in FIG. 4, the pole pedestal 306 includes a first segment 310 extending along a bottom surface 312 of the write pole 302 proximal to an ABS 328 of the write element 300 and a second segment 314 extending from the bottom surface 312 along a first side 316 of the write pole 302 nearest the NFT 304 and opposite a second side 318 of the write pole 302. The first segment 310 and the second segment 314 collectively form a three-dimensional L-shaped block of the pole pedestal 306. To accommodate the L-shaped block of the pole pedestal 306, the recessed part 308 of the write pole 302 provides an L-shaped cavity within which the L-shaped pole pedestal 306 may be formed.

The pole pedestal 306 extends across only a portion 320 of a total length 322 of the bottom surface 312 of the write pole 302, where the total length 322 of the bottom surface 312 is defined as the length from the first side 316 of the write pole 302 to the second side 318 of the write pole 302. In addition, the pole pedestal 306 extends across only a portion 324 of a total length 326 of the first side 316 of the write pole 302, where the total length 326 of the first side 316 is defined as the length from the bottom surface 312 of the write pole 302 to the end of the first side 316 of the write pole 302. In an example, the total length 322 of the bottom surface 312 may be between 10 nm and 1 micron, while the total length 326 of the first side 316 may be between 100 nm and 5 microns. Thus, the portions 320 and 324 of the bottom surface 312 and first side 316, respectively, are each less than the total lengths thereof. In addition, the portions 320 and 324 of the bottom surface 312 and first side 316, respectively, are proximal to (or nearest to) the NFT 304 to minimize and/or prevent oxidation, and thus corrosion of the write pole 302.

The lengths of the portions 320 and 324 of the bottom surface 312 and first side 316, respectively, are further selected to minimize reduction in the write field strength of the write pole 302. In an example, the length of the portion 320 of the bottom surface 312 forming the recessed part 308 may be 20 nm, and the length of the portion 324 of the first side 316 forming the recessed part 308 may be 50 nm. In other examples, the length of the portion 324 of the first side 316 may be less than 50 nm, and in some examples, between 10 nm and 30 nm. In addition, the length of the portion 320 of the bottom surface 312 may be between 5 nm and 30 nm. In some examples, the respective thicknesses of each portion 320 and 324 of the L-shape may be approximately 5 nm.

Figure 5:
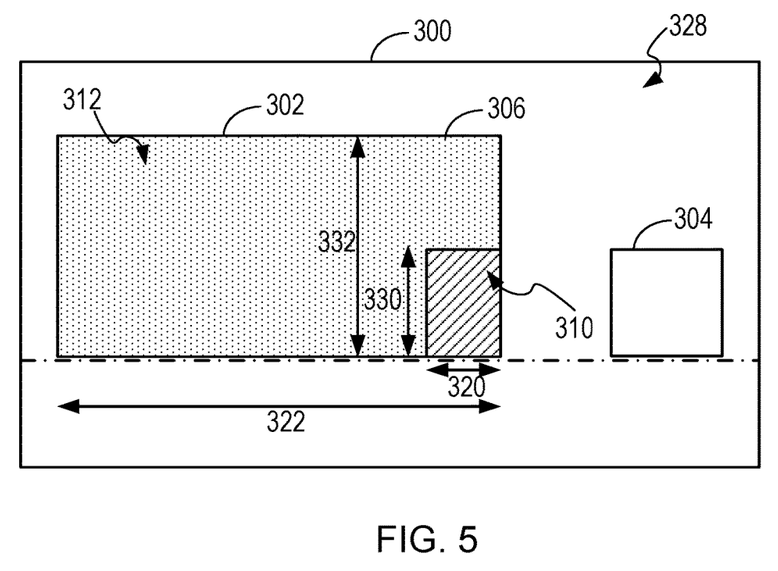
FIG. 5 is a side view of selected components of the write element of the HAMR head including a write pole having a pole pedestal within the recessed part in accordance with one embodiment of the invention.

FIG. 5 is a bottom (ABS) view of selected components of the write element 300 of FIG. 4 in accordance with one embodiment of the invention. In particular, FIG. 5 illustrates a simplified representation of the write pole 302 and NFT 304 as viewed through the ABS 328 (bottom) of the write element 300. The write pole 302 includes the pole pedestal 306 formed within the recessed part (308, shown in FIG. 4). As in FIG. 4, the pole pedestal 306 has an L-shape, of which the first segment 310 is illustrated in the bottom view of FIG. 5. The first segment 310 extends across the portion 320 of the total length 322 of the bottom surface 312 of the write pole 302. The portion 320 of the bottom surface 312 is proximal to (or nearest to) the NFT 304 to minimize and/or prevent oxidation, and thus corrosion of the write pole 302. In addition, the first segment 310 extends across a portion 330 of a half cross-track width 332 of the write pole 302. Although not shown, the second segment 314, shown in FIG. 4, may also extend across a portion of the half cross-track width 332 of the write pole 302. In an example, the half cross-track width may be between 100 nm and 200 nm, and the portion 330 of the half cross-track width 332 of the write pole 302 across which the first segment 310 extends and the portion of the half cross-track width 332 across which the second segment 314 extends may each be between 10 nm and 100 nm.

Figure 6:
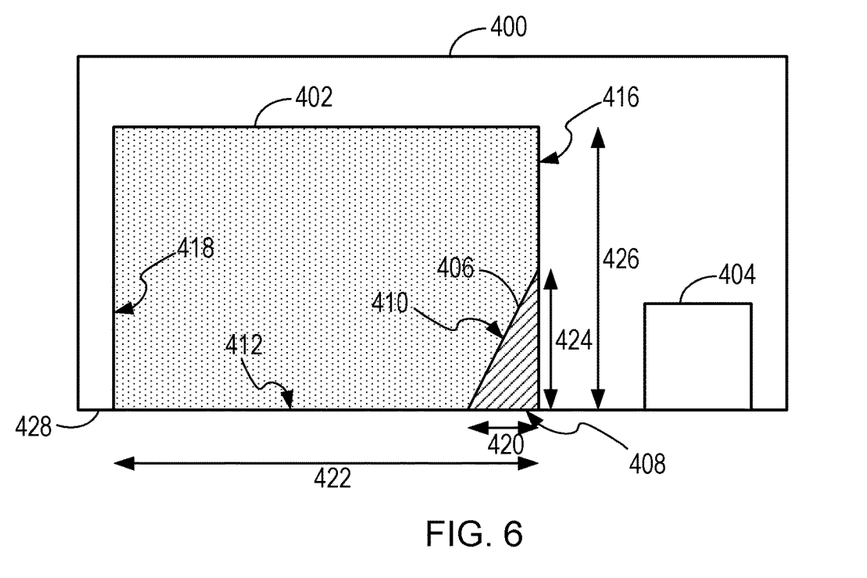
FIG. 6 is a side view of selected components of the write element of the HAMR head including a write pole having a pole pedestal within the recessed part in accordance with another embodiment of the invention.

FIG. 6 is a side view of selected components of a write element 400 of the HAMR head in accordance with another embodiment of the invention. In particular, FIG. 6 illustrates a simplified representation of a write pole 402 and NFT 404 as viewed from the side of the write element 400. In some examples, the write element 400, write pole 402, and NFT 404 may be similar to the write element 200, write pole 206, and NFT 204 shown in FIG. 3. The write pole 402 includes a first side 416, a second side 418 opposite the first side 416, and a bottom surface 412 proximal to the ABS 428 of the write element 400.

The write pole 402 includes a pole pedestal 406 formed within a recessed part 408 of the write pole 402. In the example shown in FIG. 6, the pole pedestal 406 has a chamfered shape and extends across a portion 420 of a total length 422 of the bottom surface 412 of the write pole 402 and a portion 424 of a total length 426 of the first side 416 of the write pole 402. The pole pedestal 406 is configured such that a relative distance between the NFT 404 and the write pole 402 decreases from the ABS 428 along the first side 416 of the write pole 402.

The chamfered shape produces a right-triangle cross-section of the pole pedestal 406 characterized by two sides having dimensions corresponding to the lengths of portions 420 and 424, respectively, and a hypotenuse 410 having a dimension based on the lengths of the sides. In an example, the length of the portion 420 of the bottom surface 412 may be 20 nm, and the length of the portion 424 of the first side 416 may be 50 nm, while the length of the hypotenuse 410 may be 54 nm. In other examples, the length of the portion 424 of the first side 416 may be less than 50 nm, and in some examples, between 10 nm and 30 nm. In addition, the length of the portion 420 of the bottom surface 412 may be between 5 nm and 30 nm.

Figure 7:
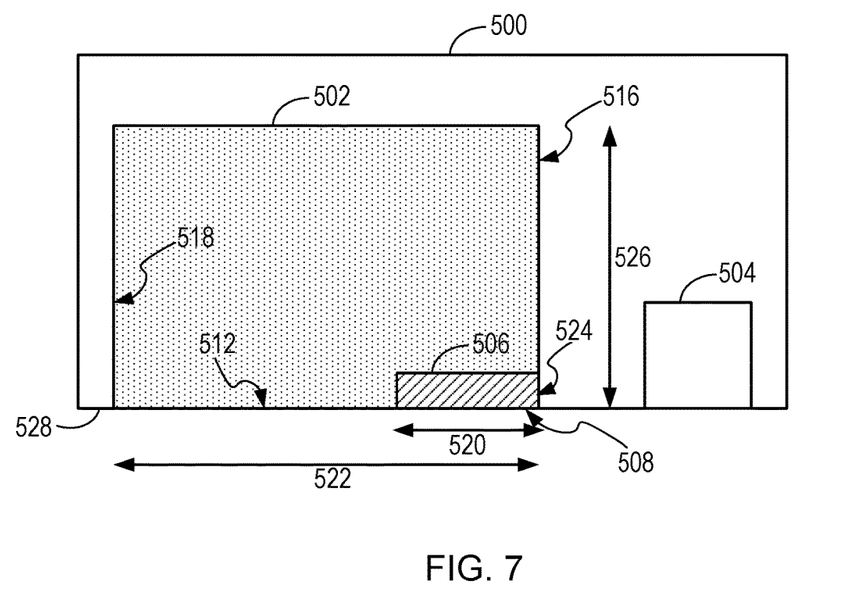
FIG. 7 is a side view of selected components of the write element of the HAMR head including a write pole having a pole pedestal within the recessed part in accordance with another embodiment of the invention.

FIG. 7 is a side view of selected components of a write element 500 of the HAMR head in accordance with another embodiment of the invention. In particular, FIG. 7 illustrates a simplified representation of a write pole 502 and NFT 504 as viewed from the side of the write element 500. In some examples, the write element 500, write pole 502, and NFT 504 may be similar to the write element 200, write pole 206, and NFT 204 shown in FIG. 3. The write pole 502 includes a first side 516, a second side 518 opposite the first side 516, and a bottom surface 512 proximal to the ABS 528 of the write element 500.

In the example shown in FIG. 7, a pole pedestal 506 having a rectangular shape is formed within a recessed part 508 of the write pole 124. The pole pedestal 506 extends across a portion 520 of a total length 522 of the bottom surface 512 of the write pole 502 and a portion 524 of a total length 526 of the first side 516 of the write pole 502. The pole pedestal 506 having the rectangular shape forms a three-dimensional rectangular block within the write pole 502.

The length of the portion 520 of the bottom surface 512 corresponds to a length of the rectangular shape, while the length of the portion 524 of the first side 516 corresponds to a width of the rectangular shape, where the length of the rectangular shape is greater than the width of the rectangular shape. In an example, the length of the rectangular shape (e.g., the length of the portion 520 of the bottom surface 512) may be 20 nm, while the width of the rectangular shape (e.g., the length of the portion 524 of the first side 516) may be 10 nm. In other examples, the width and length of the rectangular shape may each be between 10 nm and 30 nm.

Figure 8:
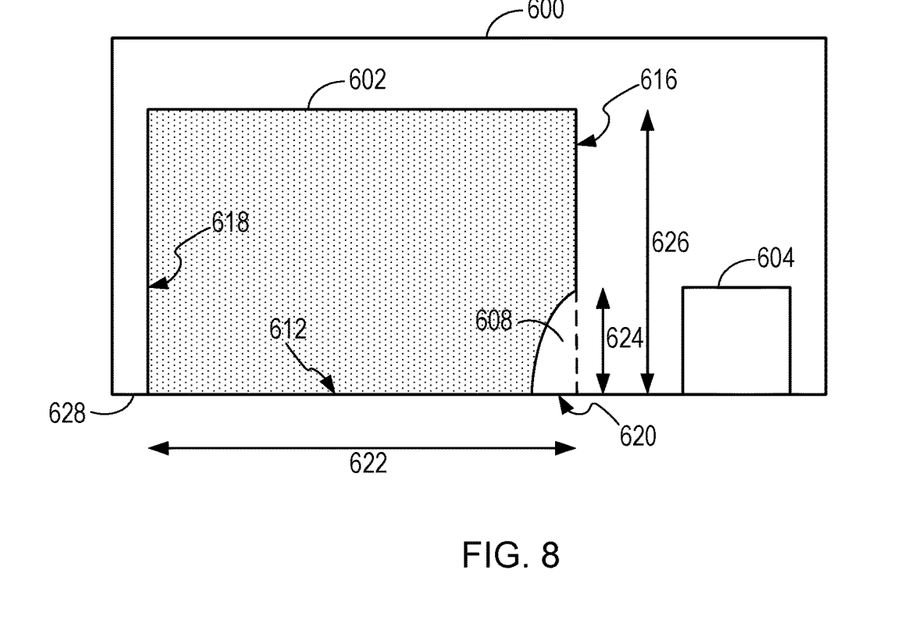
FIG. 8 is a side view of selected components of the write element of the HAMR head including a write pole having a recessed part in accordance with another embodiment of the invention.

FIG. 8 is a side view of selected components of a write element 600 of the HAMR head in accordance with another embodiment of the invention. In particular, FIG. 8 illustrates a simplified representation of a write pole 602 and NFT 604 as viewed from the side of the write element 600. In some examples, the write element 600, write pole 602, and NFT 604 may be similar to the write element 200, write pole 206, and NFT 204 shown in FIG. 3. The write pole 602 includes a first side 616, a second side 618 opposite the first side 616, and a bottom surface 612 proximal to the ABS 628 of the write element 600.

In the example shown in FIG. 8, a recessed part 608 of the write pole 602 is induced as a defect on a portion 620 of the bottom surface 612 of the write pole 602 that extends along a portion 624 of the first side 616 of the write pole 602. The recessed part 608 may be created, for example, by intentionally damaging the write pole 602 at the recessed part 608 during fabrication of the write pole 602. In an example, the defect may be introduced during the lithography process by varying the exposure time, dose, and/or mask alignment or by not removing the resist before depositing the next layer. In one embodiment, the recessed part 608 has a cylindrical shape along the width of the bottom surface 612 of the write pole 602. In one embodiment, the recessed part 608 may be filled with an insulating material, such as cladding material or other similar material.

The length of the portion 620 of the bottom surface 612 is less than a total length 622 of the bottom surface 612 of the write pole 602, and the length of the portion 624 of the first side 616 is less than the total length 626 of the first side 616 of the write pole 602. In an example, the length of the portion 620 of the bottom surface 612 forming the recessed part 608 may be 20 nm, and the length of the portion 624 of the first side 616 forming the recessed part 608 may be 50 nm. In other examples, the length of the portion 624 of the first side 616 may be less than 50 nm, and in some examples, between 10 nm and 30 nm. In addition, the length of the portion 620 of the bottom surface 612 may be between 5 nm and 30 nm.

Figure 9:
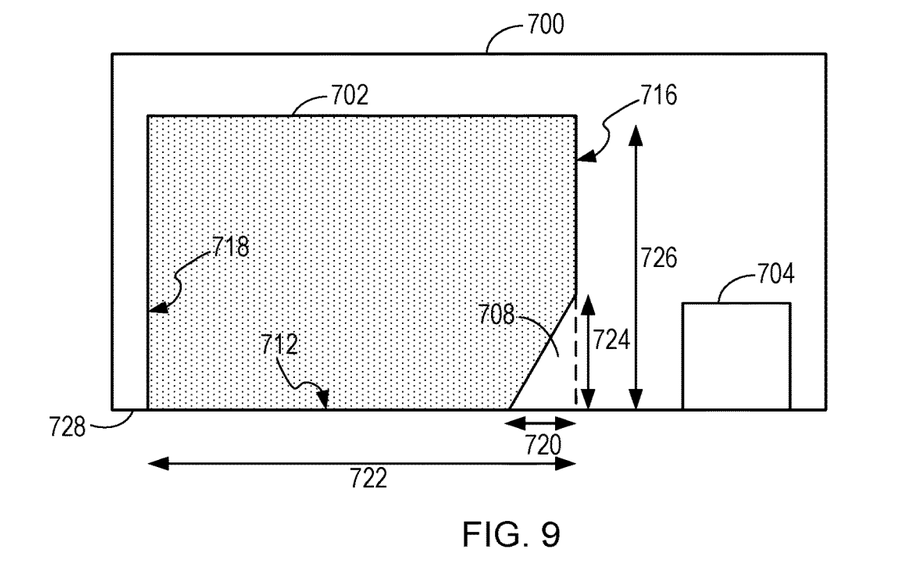
FIG. 9 is a side view of selected components of the write element of the HAMR head including a write pole having a recessed part in accordance with another embodiment of the invention.

FIG. 9 is a side view of selected components of a write element 700 of the HAMR head in accordance with another embodiment of the invention. In particular, FIG. 9 illustrates a simplified representation of a write pole 702 and NFT 704 as viewed from the side of the write element 700. In some examples, the write element 700, write pole 702, and NFT 704 may be similar to the write element 200, write pole 206, and NFT 204 shown in FIG. 3. The write pole 702 includes a first side 716, a second side 718 opposite the first side 716, and a bottom surface 712 proximal to the ABS 728 of the write element 700.

In the example shown in FIG. 9, a recessed part 708 of the write pole 702 is induced on a portion 720 of the bottom surface 712 of the write pole 702 that extends along a portion 724 of the first side 716 of the write pole 702. In the example shown in FIG. 9, the recessed part 708 has a chamfered shape that is configured such that a relative distance between the NFT 704 and the write pole 702 decreases from the ABS 728 along the first side 716 of the write pole 702.

The length of the portion 720 of the bottom surface 712 is less than a total length 722 of the bottom surface 712 of the write pole 702, and the length of the portion 724 of the first side 716 is less than a total length 726 of the first side 716 of the write pole 702. In an example, the length of the portion 720 of the bottom surface 712 forming the recessed part 708 may be 20 nm, and the length of the portion 724 of the first side 716 forming the recessed part 708 may be 50 nm. In other examples, the length of the portion 724 of the first side 716 may be less than 50 nm, and in some examples, between 10 nm and 30 nm. In addition, the length of the portion 720 of the bottom surface 712 may be between 5 nm and 30 nm.

Figure 10:
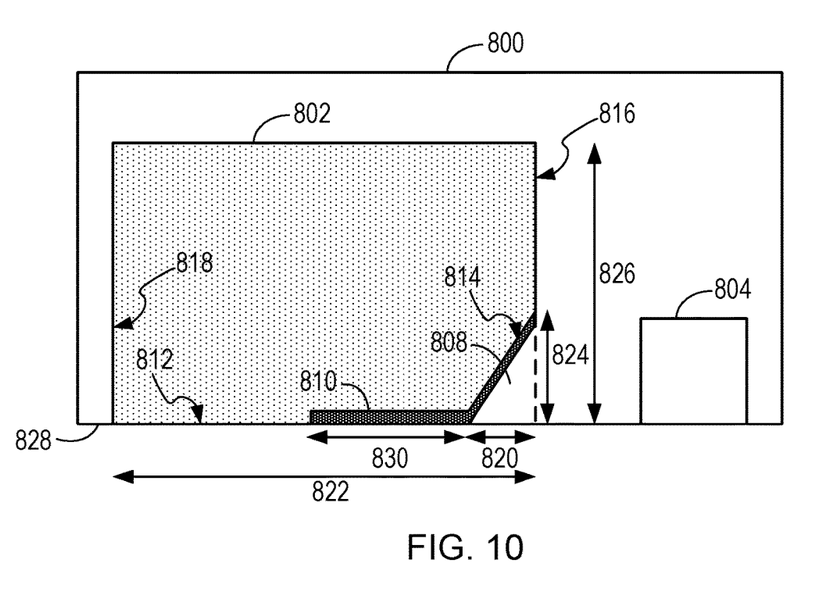
FIG. 10 is a side view of selected components of the write element of the HAMR head including a write pole having a recessed part in accordance with another embodiment of the invention.

FIG. 10 is a side view of selected components of a write element 800 of the HAMR head in accordance with another embodiment of the invention. In particular, FIG. 10 illustrates a simplified representation of a write pole 802 and NFT 804 as viewed from the side of the write element 800. In some examples, the write element 800, write pole 802, and NFT 804 may be similar to the write element 200, write pole 206, and NFT 204 shown in FIG. 3. The write pole 802 includes a first side 816, a second side 818 opposite the first side 816, and a bottom surface 812 proximal to the ABS 828 of the write element 800.

In the example shown in FIG. 10, a recessed part 808 of the write pole 802 is induced on a portion 820 of the bottom surface 812 of the write pole 802 that extends along a portion 824 of the first side 816 of the write pole 802. In the example shown in FIG. 10, the recessed part 808 has a chamfered shape that is configured such that a relative distance between the NFT 804 and the write pole 802 decreases from the ABS 828 along the first side 816 of the write pole 802. The length of the portion 820 of the bottom surface 812 is less than a total length 822 of the bottom surface 812 of the write pole 802, and the length of the portion 824 of the first side 816 is less than a total length 826 of the first side 816 of the write pole 802.

In addition, the write pole 802 further includes a protective layer 810 on a chamfered edge 814 of the write pole 802 adjacent the recessed part 808. The protective layer 810 coats the chamfered edge 814 with a material that is more resistant to corrosion than the write pole 802. For example, the protective layer 810 may include a material made of a non-magnetic material, such as a noble metal or an alloy of Rh, Ru, Jr, Au, or Pt. The protective layer 810 may further extend along at least an additional portion 830 of the bottom surface 812 of the write pole 802 adjacent the ABS 328 to provide further protection from heating of the NFT 804. In some examples, the combination of the portion 820 and additional portion 830 of the bottom surface 812 of the write pole 802 may be less than the total length 822 of the bottom surface 812 of the write pole 802.

Figure 11:
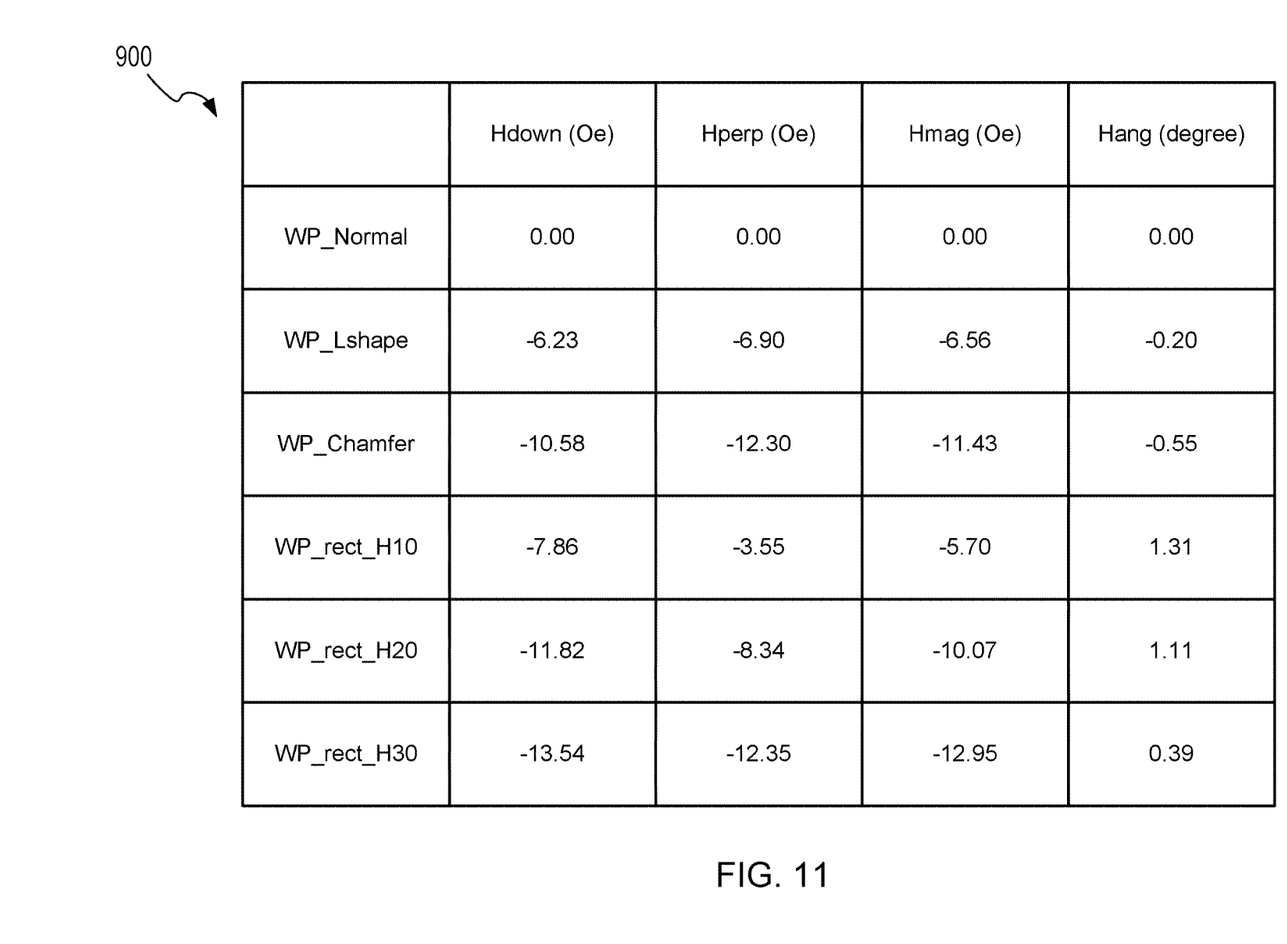
FIG. 11 is a table illustrating write field analysis results for pole pedestals of varying shapes and heights according to example embodiments.

FIG. 11 is a table 900 illustrating write field strength analysis results for pole pedestals of varying shapes and heights according to example embodiments. In the table 900, the magnetic field strength of a write pole without a recessed part (WP_Normal) is compared to the magnetic field strengths of write poles having recessed parts of various shapes and heights (e.g., lengths of the recessed portion of the first side extending from the ABS and proximal the NFT). The magnetic field strength is measured in terms of amperes/meter (A/m or H), and the table 900 illustrates the percent change in value of the magnetic field strength of the various write poles with recessed parts from the magnetic field strength of WP_Normal, where the magnetic field strength of WP_Normal is normalized to zero.

In particular, the table 900 compares the magnetic (write) field strength in the down track direction (Hdown (Oe)), the write field strength in the perpendicular direction (Hperp (Oe)), the write field strength on the magnetic layer (Hmag (Oe)) and the write field strength at a 45 degree write angle (Hang (degree)) for each of the normal write pole (WP_Normal), a write pole having an L-shaped pole pedestal (WP_Lshape), a write pole having a chamfered pole pedestal (WP_chamfer), a write pole having a rectangular shaped pole pedestal with a height of 10 nm (WP_rect_H10), a write pole having a rectangular shaped pole pedestal with a height of 20 nm (WP_rect_H20), and a write pole having a rectangular shaped pole pedestal with a height of 30 nm (WP_rect_H30).

The WP_Lshape may correspond, for example, to the pole pedestal configuration illustrated in FIG. 4. The WP_chamfer may correspond, for example, to the pole pedestal configuration illustrated in FIG. 6. The WP_rect may correspond, for example, to the pole pedestal configuration illustrated in FIG. 7.

As can be seen in the table 900, introducing a non-magnetic pole pedestal in the pole tip leading edge results in a loss of performance in the write field strength in each of the pole pedestal configurations. The field losses are due to the removal of magnetic material from the pole tip leading edge and the write pole writing to a fixed location (e.g., 20 nm down track towards the NFT).

In the examples shown in the table 900, the WP_Lshape and the WP_rect_H10 result in field losses of approximately 6 percent, whereas the WP_chamfer, WP_rect_H20 and WP_rect_H30 result in the largest degradation in field strength of approximately 12 percent. Therefore, the pole pedestals corresponding to the WP_Lshape and the WP_rect_H10 produce the lowest loss in write field strength. As such, utilizing an L-shape pole pedestal (e.g., having dimensions as described above in connection with FIG. 4) or a rectangular pole pedestal having a thin (e.g., 10 nm) height may result in a write pole having the best performance.

Figure 12:
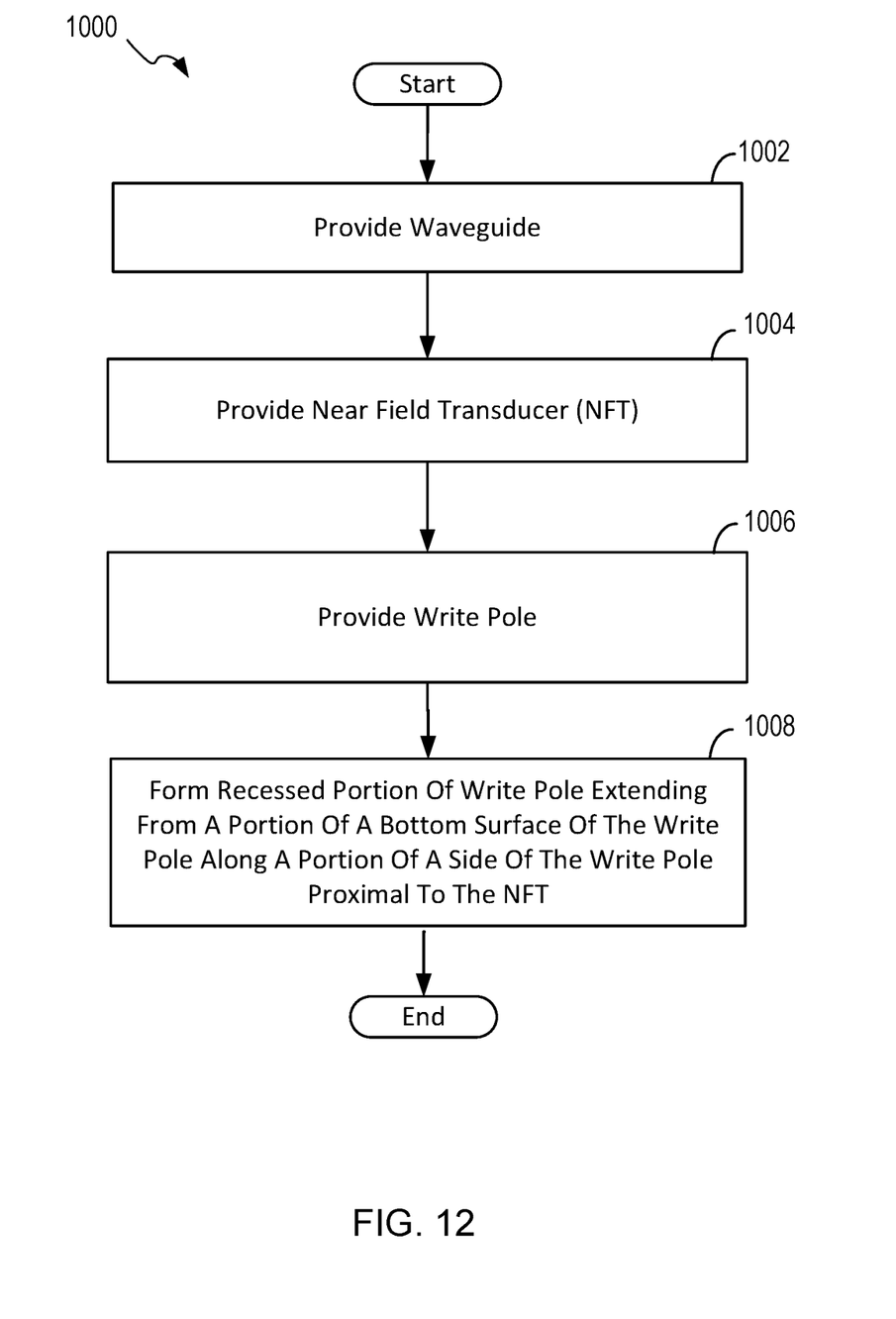
FIG. 12 is a flowchart of a process for manufacturing a write element of a HAMR head in accordance with one embodiment of the invention.

FIG. 12 is a flowchart of a process 1000 for manufacturing a write element of a HAMR head in accordance with one embodiment of the invention. In particular embodiments, the process 1000 can be used to manufacture the write element of the HAMR head of any of FIGS. 1-10. The write element may be fabricated as part of a HAMR head including both the write element and a read element.

The process first provides a waveguide in block 1002. The waveguide may include, for example, a core surrounded by cladding layers. Each of the core and cladding layers can be made of a dielectric material such as $Al_2O_3$, $SiO_xN_y$, $SiO_2$, $Ta_2O_5$, $TiO_2$, or other dielectric material. The refractive index of the core may be selected to be greater than that of the cladding layers to direct light from a laser through the core of the waveguide.

The process then provides a near-field transducer (NFT) in block 1004. The NFT may be located proximal to the air bearing surface (ABS) of the write element HAMR head. In one embodiment, the NFT can be made of a low-loss metal, such as Au, Ag, Al, Cu, or combinations thereof and can be shaped to concentrate and direct heat energy towards a magnetic medium via the ABS during a writing operation of the write element.

The process then provides a write pole in block 1006. The write pole can be made of a high moment magnetic material, such as FeCo, CoFeNi, and other similar materials. The write pole can further include a bottom surface proximal to the ABS 118, a first side proximal to the NFT and a second side opposite the first side.

The process then forms a recessed portion of the write pole at 1008. The recessed portion extends from a portion of the bottom surface of the write pole along a portion of the first side of the write pole proximal the NFT, where the portion of the bottom surface is less than a total length of the bottom surface and the portion of the first side is less than a total length of the first side. In one embodiment, the recessed part may include a pole pedestal formed of a material that is resistant to corrosion. In other embodiments, the recessed part may be formed by inducing a defect on the portion of bottom surface of the write pole that extends along the portion of the first side of the write pole.

In one embodiment, the process can perform the sequence of actions in a different order. In another embodiment, the process can skip one or more of the actions. In other embodiments, one or more of the actions are performed simultaneously. In some embodiments, additional actions can be performed. For example, in one aspect, the process may include any additional actions needed to fabricate the write element of the HAMR head of any of FIGS. 1-10.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

What is claimed is:

1. A heat assisted magnetic recording (HAMR) head for writing to a HAMR medium, comprising:
   a near field transducer (NFT) comprising an end proximal to an air bearing surface (ABS) and configured to direct light from a laser to a region on the HAMR medium; and
   a write pole configured to write to the region on the HAMR medium and comprising a bottom surface proximal to the ABS, a first side proximal to the NFT and a second side opposite the first side;
   wherein the write pole comprises a recessed part extending from a portion of the bottom surface along a portion of the first side;

wherein the portion of the bottom surface has a length less than a total length of the bottom surface and the portion of the first side has a height less than a total length of the first side;
wherein the recessed part is embedded in the write pole.

2. The HAMR head of claim 1, further comprising:
a pole pedestal within the recessed part.

3. The HAMR head of claim 2, wherein the pole pedestal comprises a material selected from the group consisting of a noble metal or alloy of Rh, Ru, Jr, Ni, V, Au, Pt, Ti, Cr, or Ta.

4. The HAMR head of claim 2, wherein the pole pedestal comprises a material selected from the group consisting of $Ta_2O_3$, $Y_2O_3$, $Cr_2O_3$, $ZrO_2$, $HfO_2$, $TiO_2$, $SiO_2$, Ferrite, Ba-Ferrite, Zn-Ferrite, or Sr-Ferrite.

5. The HAMR head of claim 2, wherein the pole pedestal comprises a material selected from the group consisting of Si, Ta, Zr, Ti, Hf, or Y.

6. The HAMR head of claim 2, wherein the pole pedestal comprises a magnetic material comprising a lower magnetic moment than the write pole or a higher atomic percentage of nickel than the write pole.

7. The HAMR head of claim 2, wherein a cross section of the pole pedestal comprises a rectangular shape that comprises a length extending along the bottom surface and a width extending along the first side, wherein the length is greater than the width.

8. The HAMR head of claim 2, wherein:
the pole pedestal comprises a first segment extending along the bottom surface of the write pole and a second segment extending from the bottom surface along the first side of the write pole; and
the first segment and the second segment form an L-shape block.

9. The HAMR head of claim 2, wherein the pole pedestal comprises a chamfer shape such that a relative distance between the NFT and the write pole decreases from the ABS along the first side.

10. The HAMR head of claim 1, wherein:
the recessed part is induced on the bottom surface of the write pole; and
the recessed part comprises a chamfer shape such that a relative distance between the NFT and the write pole decreases from the ABS along the first side.

11. The HAMR head of claim 10, further comprising:
a protective layer on a chamfered edge of the write pole adjacent the recessed part, wherein the protective layer further extends along at least an additional portion of the bottom surface, wherein the protective layer comprises a material selected from the group consisting of a noble metal or alloy of Rh, Ru, IR, Au, or Pt.

12. The HAMR head of claim 1, further comprising:
a heat sink thermally coupled to the recessed part.

13. A data storage device comprising the HAMR head of claim 1.

14. A method for fabricating a heat assisted magnetic recording (HAMR) head for writing to a HAMR medium, the method comprising:
providing a waveguide optically coupled to a laser and configured to direct light from the laser towards an air bearing surface (ABS) of the HAMR head;
providing a near field transducer (NFT) comprising an end proximal to the ABS and optically coupled to the waveguide to focus the light onto a region on the HAMR magnetic recording medium; and
providing a write pole configured to write to the region on the HAMR magnetic recording medium and comprising a bottom surface proximal to the ABS, a first side proximal to the NFT and a second side opposite the first side, wherein providing the write pole further comprises:
forming a recessed part extending from a portion of the bottom surface along a portion of the first side, wherein the portion of the bottom surface has a length less than a total length of the bottom surface and the portion of the first side has a height less than a total length of the first side, wherein the recessed part is embedded in the write pole.

15. The method of claim 14, wherein providing the write pole further comprises:
filling the recessed part with a material forming a pole pedestal.

16. The method of claim 15, wherein filling the recessed part with the material forming the pole pedestal further comprises:
forming a first segment of the pole pedestal extending along the bottom surface of the write pole; and
forming a second segment of the pole pedestal extending from the bottom surface along the first side of the write pole, wherein the first segment and the second segment form an L-shape block.

17. The method of claim 15, wherein filling the recessed part with the material forming the pole pedestal further comprises:
forming the pole pedestal comprising a chamfer shape such that a relative distance between the NFT and the write pole decreases from the ABS along the first side.

18. The method of claim 14, wherein forming the recessed part further comprises:
inducing the recessed part comprising a chamfer shape along the portion of the bottom surface and the portion of the first side such that a relative distance between the NFT and the write pole decreases from the ABS along the first side.

19. The method of claim 14, further comprising:
providing a heat sink thermally coupled to the recessed part; and
providing at least one coil configured to generate a magnetic field transferred to the write pole to apply a recording magnetic field to the region on the HAMR medium.

20. A heat assisted magnetic recording (HAMR) head for writing to a HAMR medium, comprising:
means for directing light from a laser to a region on the HAMR medium through an air bearing surface (ABS) of the HAMR head; and
means for writing to the region on the HAMR medium comprising a bottom surface proximal to the ABS and a side proximal to the means for directing light, wherein the means for writing further comprises means for protecting the means for writing from corrosion;
wherein the means for protecting extends from a portion of the bottom surface along a portion of the side;
wherein the portion of the bottom surface has a length less than a total length of the bottom surface and the portion of the side has a height less than a total length of the side;
wherein the means for protecting is embedded in the means for writing.

* * * * *